(12) United States Patent
Drost (10) Patent No.: US 7,296,766 B2
(45) Date of Patent: Nov. 20, 2007

(54) LIGHTWEIGHT STRUCTURAL DAMPING ASSEMBLY

(75) Inventor: Stuart K. Drost, Shelton, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 0 days.

(21) Appl. No.: 10/889,700

(22) Filed: Jul. 13, 2004

(65) Prior Publication Data

US 2006/0032973 A1 Feb. 16, 2006

(51) Int. Cl.
*F16F 7/00* (2006.01)

(52) U.S. Cl. .................. 244/1 R; 248/562; 248/569; 188/379

(58) Field of Classification Search ............. 244/17.27, 244/39, 129.1 N, 1 R, 117 R, 133, 118.5, 244/21, 17.11; 416/134 A, 140, 500; 188/250 B, 188/250 G, 251 M
See application file for complete search history.

(56) References Cited

U.S. PATENT DOCUMENTS

| | | | | | |
|---|---|---|---|---|---|
| 1,872,765 | A | * | 8/1932 | Lee | 248/634 |
| 2,482,488 | A | * | 9/1949 | Julien | 267/33 |
| 3,047,163 | A | * | 7/1962 | Johnson et al. | 213/40 R |
| 3,544,415 | A | * | 12/1970 | Price et al. | 428/76 |
| 4,108,508 | A | * | 8/1978 | Clinard, Jr. | 384/221 |
| 4,111,386 | A | * | 9/1978 | Kenigsberg et al. | 244/17.27 |
| 4,133,157 | A | * | 1/1979 | Bschorr et al. | 248/638 |
| 4,458,862 | A | * | 7/1984 | Mouille et al. | 244/17.27 |
| 4,543,040 | A | * | 9/1985 | McArdle et al. | 416/134 A |
| 4,566,231 | A | | 1/1986 | Konsevich | |
| 5,094,318 | A | * | 3/1992 | Maeda et al. | 181/290 |
| 5,271,678 | A | * | 12/1993 | Bourgeot | 384/221 |
| 5,310,137 | A | * | 5/1994 | Yoerkie et al. | 244/17.27 |
| 5,407,034 | A | * | 4/1995 | Vydra et al. | 188/73.37 |
| 5,641,133 | A | * | 6/1997 | Toossi | 244/17.27 |
| 5,690,035 | A | * | 11/1997 | Hatayama et al. | 105/452 |
| 5,924,261 | A | | 7/1999 | Fricke | |
| 6,080,066 | A | | 6/2000 | Rastegar | |
| 6,112,410 | A | | 9/2000 | Rastegar | |
| 6,138,947 | A | * | 10/2000 | Welsh et al. | 244/17.27 |

* cited by examiner

*Primary Examiner*—Timothy D. Collins
(74) *Attorney, Agent, or Firm*—Carlson, Gaskey & Olds (57) ABSTRACT

A structural damping assembly includes a bonding plate, a stiffener layer, an elastomeric layer, and a constraining layer. The elastomeric layer is boned between the stiffener layer and the constraining layer. The bonding plate and the stiffener layer extend between, and are preferably in contact with, webs which form a pocket on a substrate such as a transmission support beam. The structural damping assembly uses the energy dissipating properties of the elastomeric layer that is sandwiched between the vibrating stiffener layer and the constraining layer to combat noise due to resonant response while operating as a stiffener that increases the frequency of resonance to a range where coincidental placement with an excitation frequency is reduced.

37 Claims, 7 Drawing Sheets

LIGHTWEIGHT STRUCTURAL DAMPING ASSEMBLY

BACKGROUND OF THE INVENTION

The present invention relates to a damping assembly, and more particularly to a lightweight member, which is mountable to an airframe subcomponent to provide simultaneous localized structural stiffening and damping to reduce aircraft interior noise levels.

A primary determinant of aircraft interior noise levels is the response of the airframe structure to vibration excitation. Each individual component or subcomponent of an airframe has characteristic natural or resonant frequencies that can be coincident with one or more excitation frequencies. This would cause an individual component or sub-component to resonate and emit high noise levels, effectively acting as a speaker in the airframe.

Conventional constrained or shear layer damping has long been provided to address resonant response in an airframe, but damping treatments can be unacceptably heavy or have only limited effectiveness for thicker structural members such as helicopter transmission support beams. Modifying the stiffness of an individual component or subcomponent can also be effective in reducing noise by moving resonance frequencies away from excitation frequencies, but such modifications may require unacceptable design, structural analysis, certification and/or tooling costs for existing airframe designs.

Because resonance frequencies vary from airframe to airframe for a given aircraft model, adding stiffness by itself to an airframe component can adversely result in moving a given resonance frequency closer to an excitation frequency. A device that simultaneously adds both stiffening and damping, however, can potentially mitigate the shortcomings of both in certain applications.

Accordingly, it is desirable to provide a lightweight structural stiffening and damping assembly for airframe components, which does not impede inspection requirements or add additional resonance effects.

SUMMARY OF THE INVENTION

The structural damping assembly according to the present invention includes a bonding plate, a stiffener layer, an elastomeric layer, and a constraining layer. The elastomeric layer is boned between the stiffener layer and the constraining layer. The bonding plate and the stiffener layer extend between, and are preferably in contact with, webs which form a pocket within a substrate such as a transmission support beam. The stiffener and the constraining layer are an inverted open shape such as a V-shaped member in which the open end of the V is attached to the bonding plate.

The structural damping assembly uses the energy dissipating properties of the elastomeric layer that is sandwiched between the vibrating stiffener layer and the constraining layer. This layer type damping depends on the shear induced between the constraining layer and the substrate for performance. The structural damping assembly operates to combat noise due to resonant response and operates as a stiffener that increases the frequency of resonance to a range where coincidental placement with an excitation frequency is reduced while operating as a shear multiplier.

The present invention therefore provides a lightweight structural stiffening and damping assembly for airframe components which does not impede inspection requirements or add additional resonance effects.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
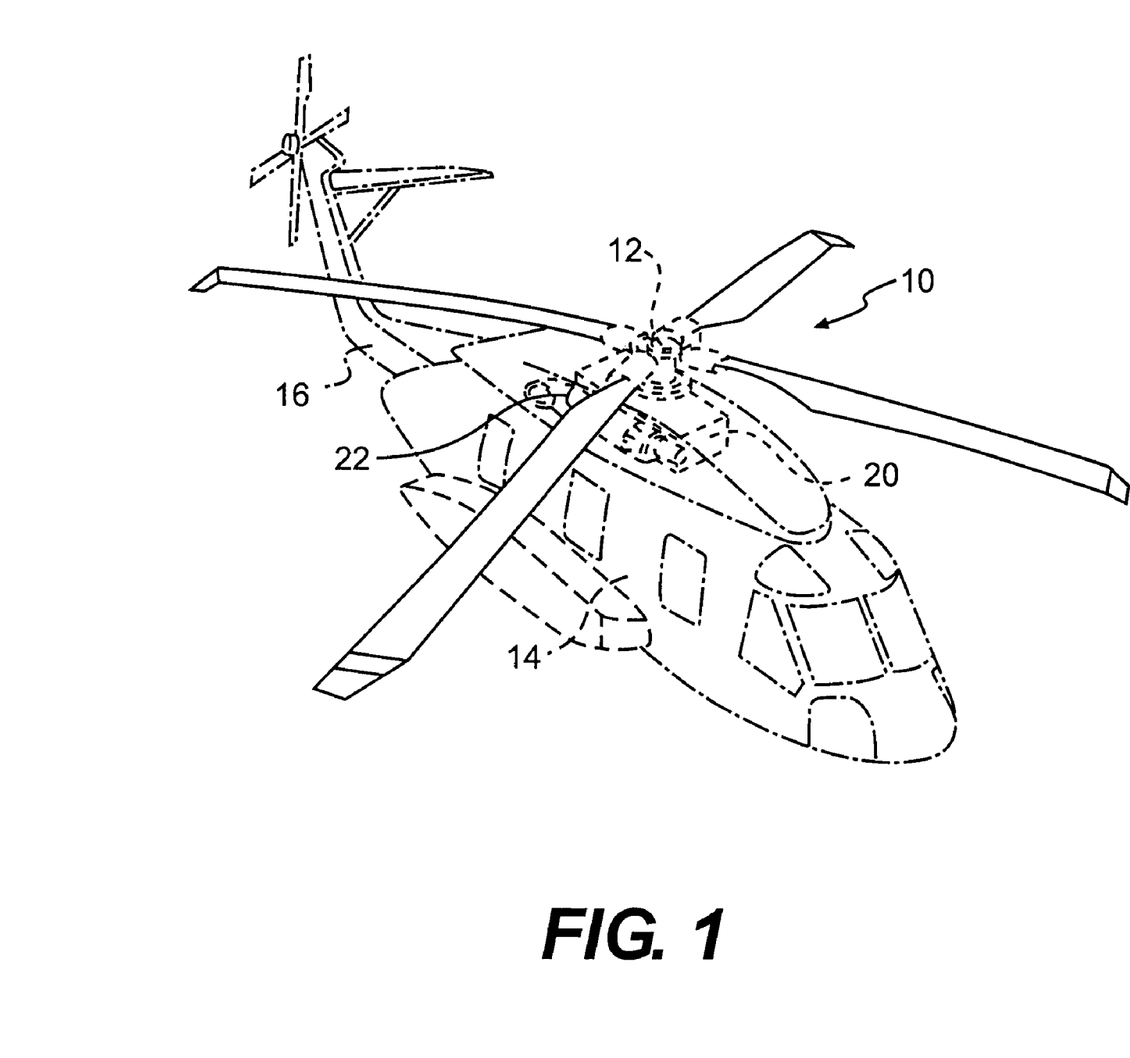
FIG. 1 is a general perspective view of an exemplary rotary wing aircraft embodiment for use with the present invention.

FIG. 1 schematically illustrates a rotary-wing aircraft 10 having a main rotor assembly 12. The aircraft 10 includes an airframe 14 having an extending tail 16 which mounts an anti-torque rotor 18. The main rotor assembly 12 is driven through a transmission (illustrated schematically at 20) by one or more engines 22. Although a particular helicopter configuration is illustrated in the disclosed embodiment, other machines such as turbo-props, tilt-rotor and tilt-wing aircraft will also benefit from the present invention.

Figure 2:
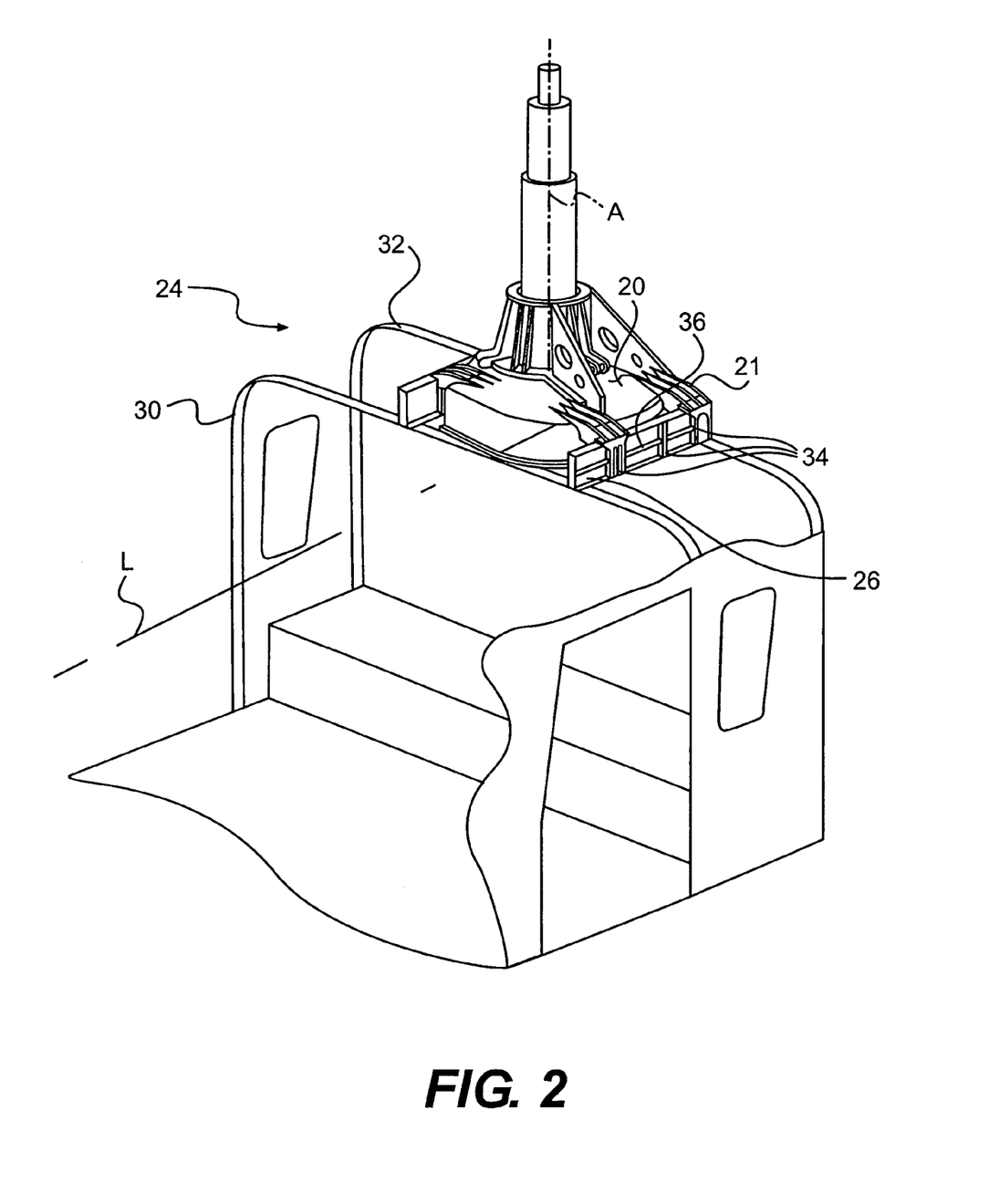
FIG. 2 is an partial perspective view of a rotor support structure assembly with a structural damping assembly of the present invention.

Referring to FIG. 2, a main rotor support structure assembly 24 (illustrated schematically) includes a left-hand transmission beam 28L and a right-hand transmission beam 28R which support the transmission 20 (illustrated schematically). The transmission 20 defines a main rotor axis A about which the main rotor assembly 12 (FIG. 1) rotates. The transmission 20 includes a multiple of mounting feet 21 (illustrated somewhat schematically) which are supported upon the left-hand transmission beam 28L and the right-hand transmission beam 28R. The left-hand transmission beam 28L is preferably located parallel to the right-hand transmission beam 28R and generally parallel to an aircraft longitudinal axis L. The left-hand transmission beam 28L and the right-hand transmission beam 28R are supported by and transverse to a forward support structure bulkhead 30 and an aft support structure bulkhead 32. It should be understood that various other support structure configurations will likewise benefit from the present invention and that the present invention is applicable to other vehicles and locations.

Figure 3:
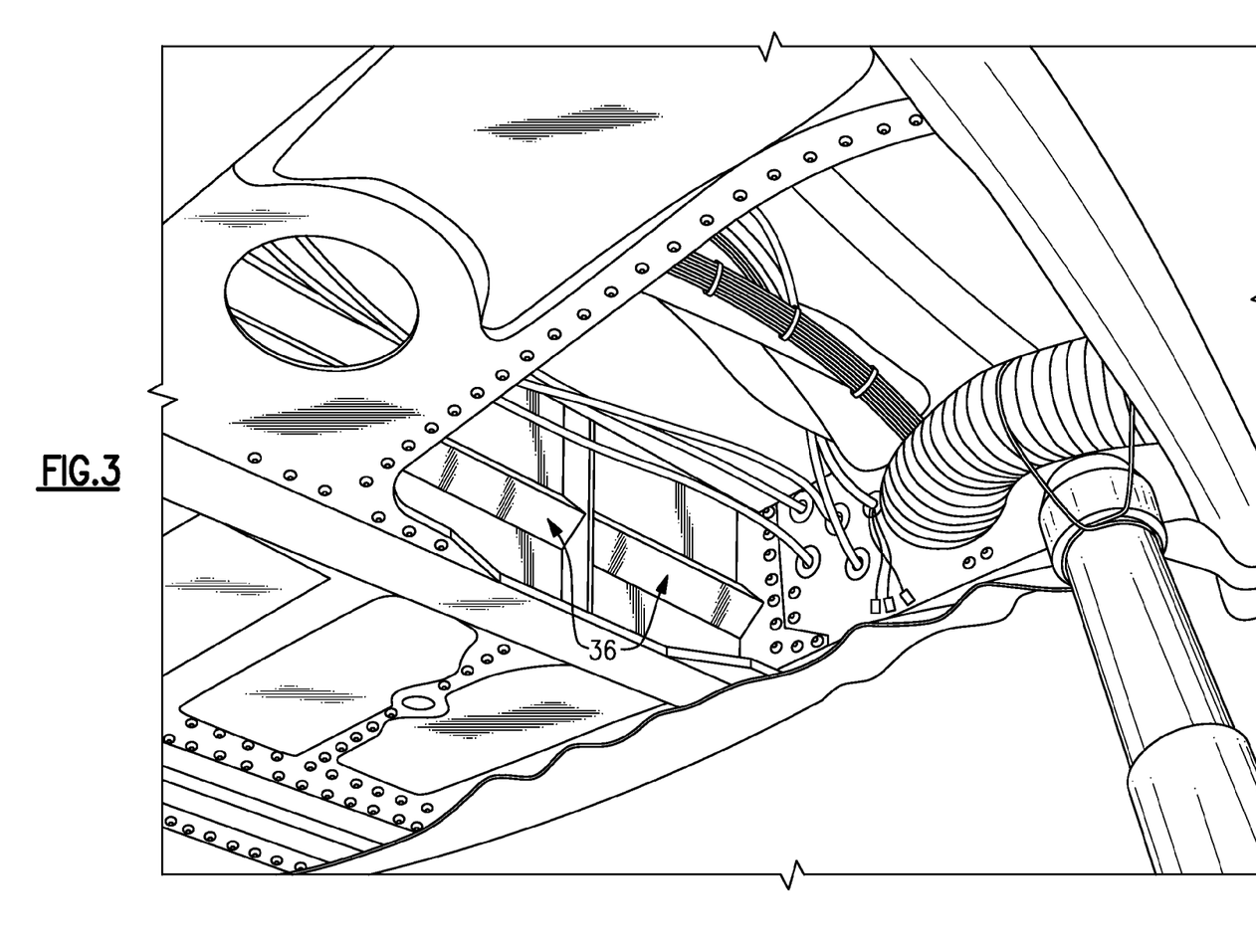
FIG. 3 is an expanded perspective view of the structural damping assembly of the present invention.

The left-hand transmission beam 28L and the right-hand transmission beam 28R are generally planar members with a multiple of webs 34. The webs 34 extend perpendicular from, and generally transverse to, the longitudinal length of a planar surface 26 formed by the transmission beams 28L, 28R. It should be understood that the term "web" as used herein includes any structure such as a bulkhead B (also illustrated in FIG. 3) which extends perpendicular from a substrate S (the planar surface 26) to form a pocket P therebetween. That is, the pocket P may be formed between any two "webs" such as a stiffener and/or bulkhead B which extend from the substrate S.

Figure 4:
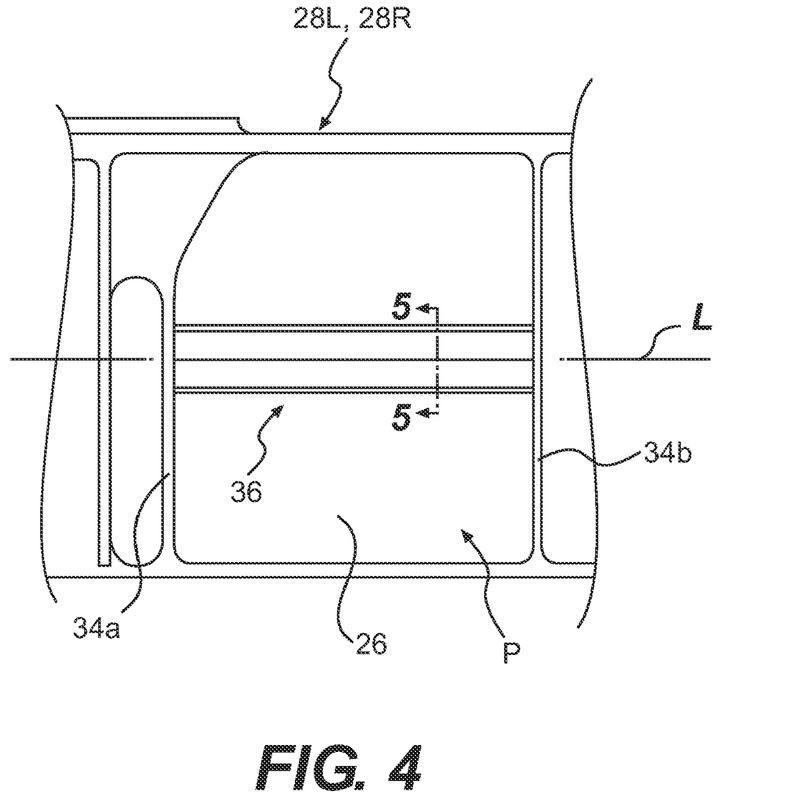
FIG. 4 is a plan view of a structural damping assembly of the present invention.

A structural damping assembly 36 is preferably located in the pocket P defined between two webs 34 of the transmission beams 28L, 28R (also illustrated in FIG. 4). The structural damping assembly 36 is preferably located parallel to the longitudinal length of the transmission beams 28L, 28R and perpendicular to the pair of webs 34. Although, a multiple of structural damping assembly 36 are oriented in a linear arrangement in FIG. 3, it should be understood that other locations, orientations and structure other than transmission beams will also benefit from the present invention.

Referring to FIG. 4, the structural damping assembly 36 (one shown) is mounted to the planar surface 26 between a first web 34a and a second web 34b of the transmission beams 28L, 28R to define a longitudinal axis L. That is, the structural damping assembly 36 is located in a pocket P formed between the webs 34a,34b. The structural damping assembly 36 is fixed in place through bonding, welding or other attachment. Extension of the structural damping assembly 36 across the pocket P results in simultaneous stiffening and damping of the structure to which the structural damping assembly 36 is attached.

Figure 5:
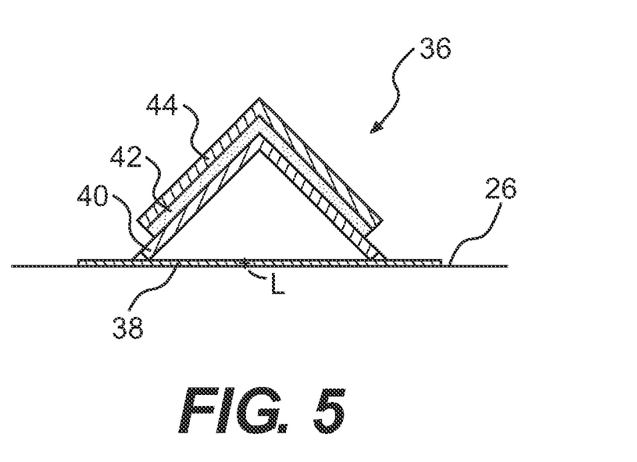
FIG. 5 is a sectional view of a structural damping assembly taken along the line 5-5 of FIG. 4.

Referring to FIG. 5, the structural damping assembly 36 includes a bonding plate 38, a stiffener layer 40, an elastomeric layer 42, and a constraining layer 44. The bonding plate 38 is a planar member to provide a relatively large surface area for bonding of the structural damping assembly 36 to the planar surface 26. The elastomeric layer 42 is bonded between the stiffener layer 40 and the constraining layer 44 such that it is sandwiched therebetween. Most preferably, the elastomeric layer 42 is bonded on the faces between the stiffener layer 40 and the constraining layer 44 to include the apex thereof such that the elastomeric layer 42 completely fills the interface between the stiffener layer 40 and the constraining layer 44. The elastomeric layer 42 is preferably DYAD 601 such as that manufactured by the Soundcoat Company of Deer Park, N.Y., USA. The bonding plate 38, the stiffener layer 40, and the constraining layer 40 extend between, and are preferably in contact with, the webs 34a,34b.

Figure 6:
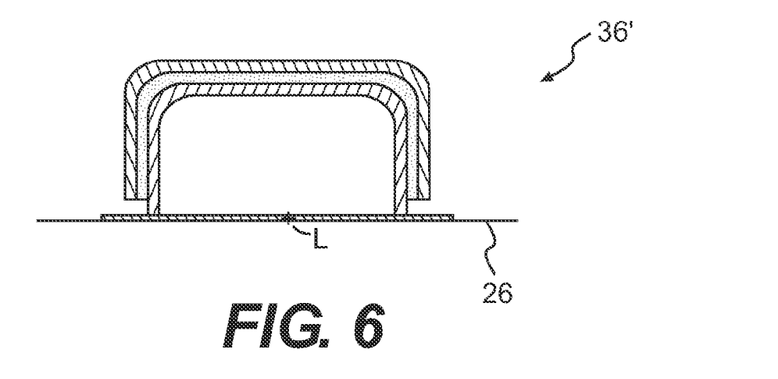
FIG. 6 is a sectional view of another structural damping assembly.
Figure 7:
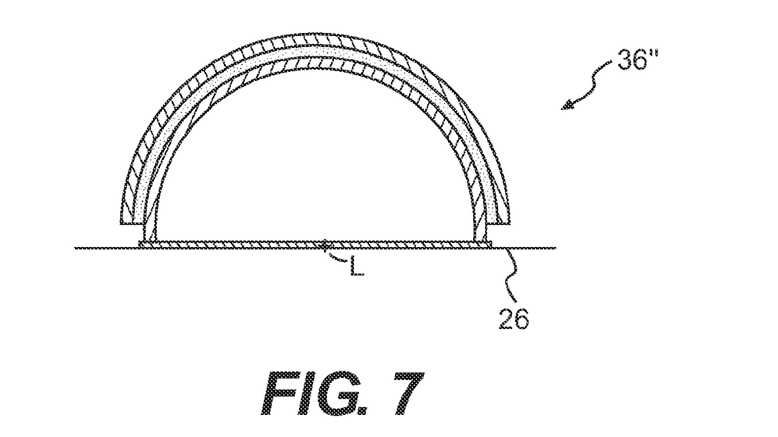
FIG. 7 is a sectional view of another structural damping assembly.
Figure 8:
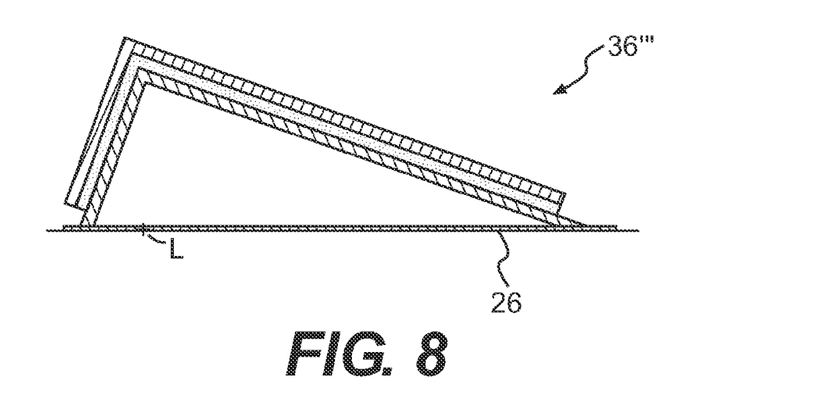
FIG. 8 is a sectional view of another structural damping assembly.

The stiffener 40 and the constraining layer 44 are preferably an inverted V-shaped member in which the open side of the V is attached to the bonding plate 38. Other open-sided shapes such as, for example only, an inverted U-shaped structural damping assembly 36' (FIG. 6), inverted semi-circular shaped structural damping assembly 36" (FIG. 7), or L-shaped structural damping assembly 36''' (FIG. 8), may also be used with the present invention. Still other, more complex shapes such as an inverted open-sided rectangular, pentagonal, etc. shape may also be used with the present invention but may be more costly to manufacture. Furthermore, because the inverted open-sided shape has no loose or unconstrained side (as in an inverted T design), there are no additional resonance issues introduced by the installation.

The structural damping assembly 36 provides constrained layer damping to reduce resonant vibrations and resultant structure borne noise. This technique uses the energy dissipating properties of the elastomeric layer 42 that is sandwiched between the vibrating stiffener layer 40 and the constraining layer 44. This layer type damping depends on the shear induced between the constraining layer 44 and the stiffener layer 40 for performance. The structural damping assembly 36 operates to combat noise due to resonant response and operates as a stiffener that increases the frequency of resonance to a range where coincidental placement with an excitation frequency is reduced. The stiffener layer 40 operates as a shear multiplier.

Figure 9A:
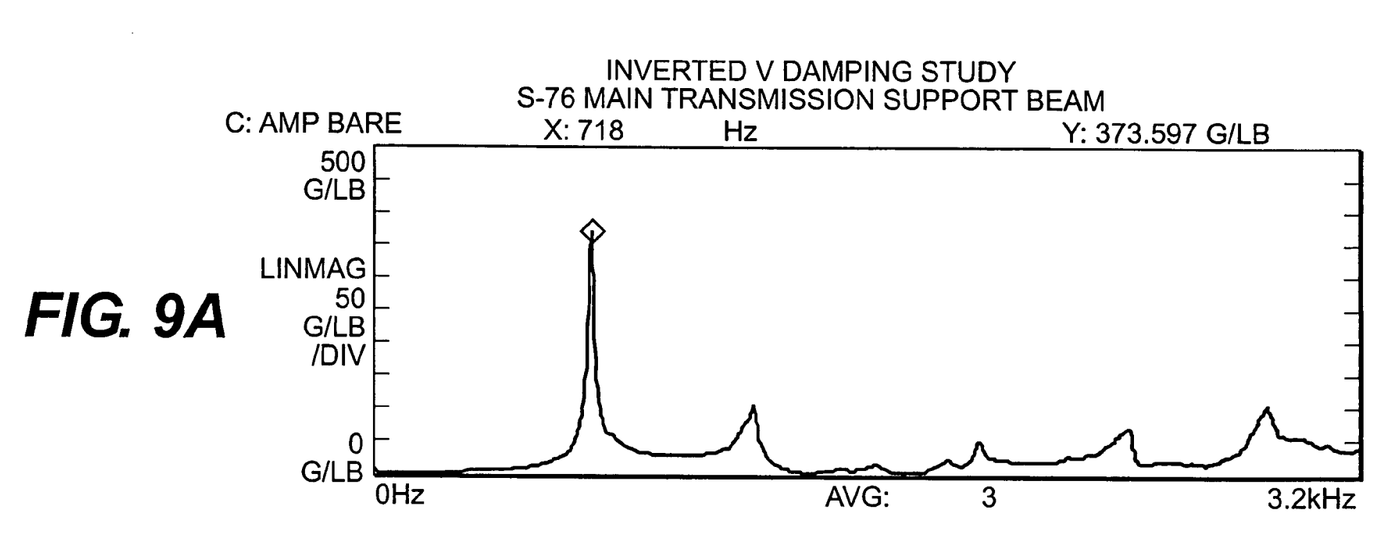
FIG. 9A is a graphical representation of a resonance response characteristics of a rotor support structure assembly without the structural damping assembly according to the present invention.
Figure 9B:
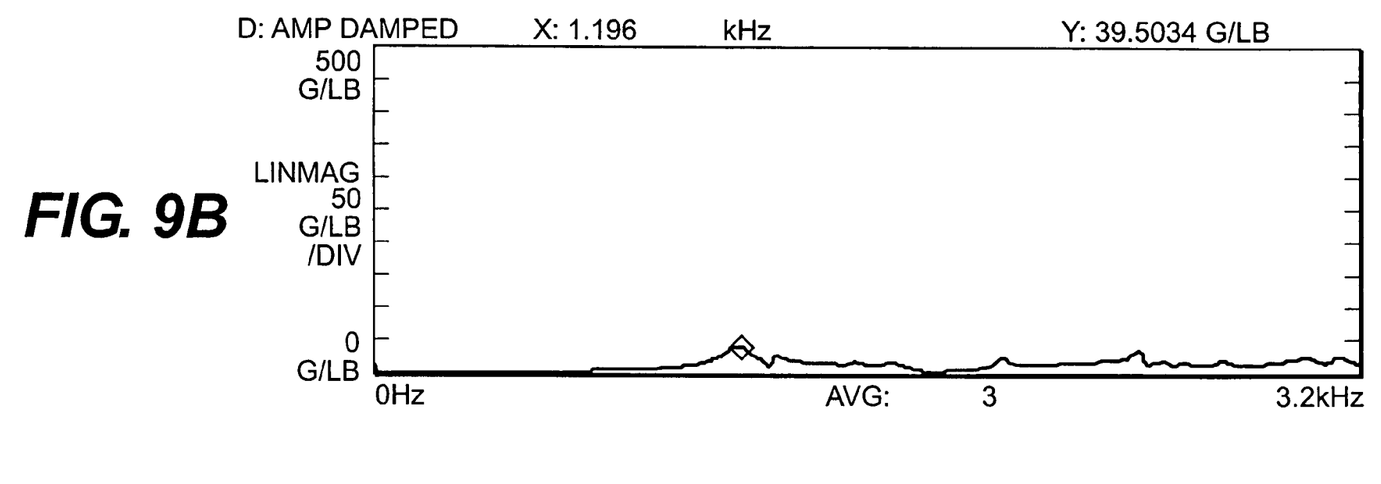
FIG. 9B is a graphical representation of a resonance response characteristics of a rotor support structure assembly with the structural damping assembly according to the present invention.

The resonance response characteristics of an exemplary beam pocket were measured for no treatment (FIG. 9A) and a beam pocket with the structural damping assembly 36 (FIG. 9B). The frequency response trace of FIG. 9A illustrates the baseline resonant peak of the beam pocket at 718 Hz. The FIG. 9B response trace depicts the same beam pocket with the structural damping assembly 36 installed which shifted the resonant frequency up to 1196 Hz and damped the response to a fraction of its original amplitude.

In-flight interior noise level within an aircraft cabin is primarily due to the resonant frequency of the gear mesh such as the primary or bull gear of the transmission 20 which drives the rotor system 12 (FIG. 1). The structural damping assembly 36 shifts the resonant frequency of the transmission beams 28L, 28R away from the resonant frequency of the gear mesh to a range where coincidental placement with an excitation frequency is reduced, which facilitates a decrease in the in-flight interior noise level within the aircraft cabin.

Figure 10:
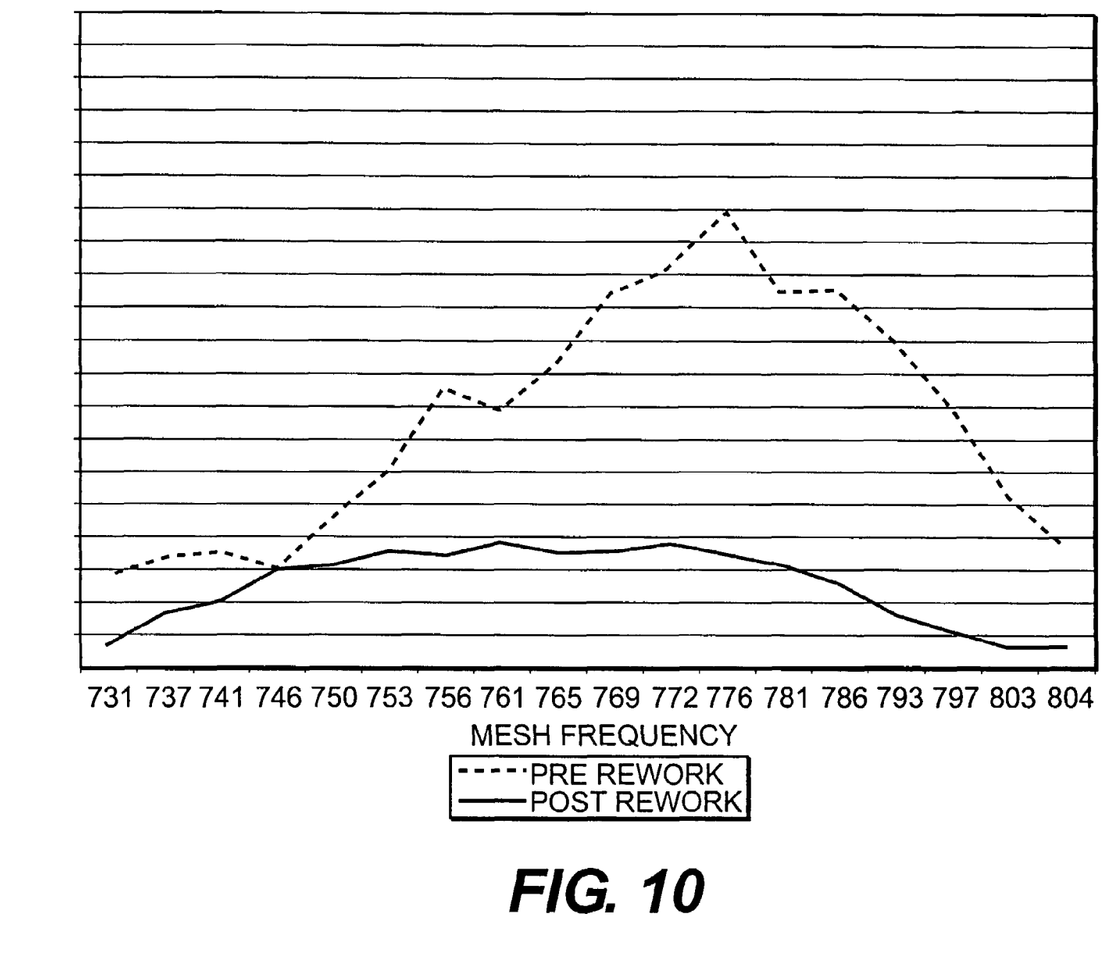
FIG. 10 is a graphical representation of an acoustic response within an aircraft cabin during rotor speed sweeps with and without the structural damping assembly according to the present invention.

Referring to FIG. 10, noise data was acquired to measure the acoustic response within an example aircraft cabin, such as an S-76B, during rotor speed (Nr) sweeps both prior to (dashed trace) and post installation of the structural damping assembly 36 (solid trace). The results of these Nr sweeps depict a significant decrease in acoustic resonance response at operational rotor speed which results in a decrease in cabin noise levels at the transmission 20 (FIG. 1) bull gear meshing tone.

Notably, the structural damping assembly 36 installed within the aircraft was extremely light and weighed 1.01 pounds in its entirety. The area covered by the installation is fractional compared to the amount of material coverage that would be required to obtain similar results with conventional materials. Because of the small size of the structural damping assembly 36, inspection requirements for the flight critical component transmission beams are unimpeded.

It should be understood that relative positional terms such as "forward," "aft," "upper," "lower," "above," "below," and the like are with reference to the normal operational attitude of the vehicle and should not be considered otherwise limiting.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A structural damping assembly comprising:
   a bonding plate which defines a longitudinal axis, said bonding plate generally planar in cross-section transverse to said longitudinal axis;
   a stiffener layer defined along said longitudinal axis, said stiffener layer attached to said bonding plate to define a first open-sided shape in cross-section transverse to said longitudinal axis which faces said bonding plate;
   a constraining layer defined along said longitudinal axis, said constraining layer defines a second open-sided shape in cross-section transverse to said longitudinal axis, said second open-sided shape generally having the same cross-sectional shape of said first open-sided shape; and
   an elastomeric layer sandwiched between said stiffener layer and said constraining layer such that shear is induced between said constraining layer and said stiffener layer generally along said longitudinal axis.

2. The structural damping assembly as recited in claim 1, wherein said bonding plate is a generally planar member.

3. The structural damping assembly as recited in claim 1, wherein said stiffener layer is attached to said bonding plate at a first edge and a second edge which define an open side of said open-sided shape.

4. The structural damping assembly as recited in claim 1, wherein said first open-sided shape is an inverted V-shape, said stiffener layer attached to said bonding plate at an open side of said V-shape.

5. The structural damping assembly as recited in claim 4, wherein said second open-sided shape is an inverted V-shape.

6. The structural damping assembly as recited in claim 1, wherein said second open-sided shape is an inverted U-shape, said stiffener layer attached to said bonding plate at an open side of said U-shape.

7. The structural damping assembly as recited in claim 6, wherein said second open-sided shape is an inverted U-shape.

8. The structural damping assembly as recited in claim 1, wherein said second open-sided shape is an inverted semi-circular shape, said stiffener layer attached to said bonding plate at an open side of said semi-circular shape.

9. The structural damping assembly as recited in claim 8, wherein said second open-sided shape is an inverted semi-circular shape.

10. A support structure assembly comprising:
    a support structure including a first web and a second web extending from a substrate;
    a bonding plate attached to said substrate between said first web and said second web which defines a longitudinal axis, said bonding plate generally planar in cross-section transverse to said longitudinal axis;
    a stiffener layer defined along said longitudinal axis, said stiffener layer attached to said bonding plate to define a first open-sided shape in cross-section transverse to said longitudinal axis, said stiffener layer attached to said bonding plate;
    a constraining layer defined along said longitudinal axis, said constraining layer defines a second open-sided shape in cross-section transverse to said longitudinal axis, said second open-sided shape generally having the same cross-sectional shape of said first open-sided shape; and
    an elastomeric layer sandwiched between said stiffener layer and said constraining layer such that shear is induced between said constraining layer and said stiffener layer generally along said longitudinal axis.

11. The support structure assembly as recited in claim 10, wherein said stiffener layer is attached to said bonding plate at a first edge and a second edge which define an open side of said first open-sided shape.

12. The support structure assembly as recited in claim 11, wherein said support structure includes a transmission beam.

13. The structural damping assembly as recited in claim 1, wherein said stiffener layer is attached to said bonding plate along a first and second generally linear force transmitting surface to bound said first open-sided shape which faces said bonding plate.

14. The structural damping assembly as recited in claim 1, wherein said stiffener layer is attached to said bonding plate along a first and a second edge to bound said first open-sided shape which faces said bonding plate.

15. The structural damping assembly as recited in claim 1, wherein said elastomeric layer is bonded to said stiffener layer and said constraining layer at a respective contiguous surface.

16. The structural damping assembly as recited in claim 1, wherein said elastomeric layer is bonded to said stiffener layer opposite said open-sided shape.

17. The structural damping assembly as recited in claim 1, wherein an open side of said first open-sided shape is closed by said bonding plate.

18. The support structure assembly as recited in claim 10, wherein said stiffener layer is attached to said bonding plate along a first and second generally linear force transmitting surface to bound said first open-sided shape which faces said bonding plate.

19. The support structure assembly as recited in claim 10, wherein said elastomeric layer is bonded to said stiffener layer and said constraining layer at a respective contiguous surface.

20. The support structure assembly as recited in claim 10, wherein a first web and a second web extend from said substrate in a generally perpendicular relationship.

21. The support structure assembly as recited in claim 20, wherein said bonding plate, said stiffener layer, and said constraining layer are in contact with said first web and said second web.

22. The support structure assembly as recited in claim 20, wherein said bonding plate is in contact with said first web and said second web.

23. The support structure assembly as recited in claim 20, wherein said constraining layer is in contact with said first web and said second web.

24. The support structure assembly as recited in claim 10, wherein an open side of said first open-sided shape is closed by said bonding plate.

25. A dampening assembly comprising:
    a stiffener layer defined along a longitudinal axis, said stiffener layer attached to a support structure such that that said stiffener layer defines a first open-sided shape in cross-section transverse to said longitudinal axis which faces said structure;
    a constraining layer which defines a second open-sided shape in cross-section transverse to said longitudinal axis, said second open-sided shape generally having the same cross-sectional shape of said first open-sided shape; and an elastomeric layer sandwiched between said stiffener layer and said constraining layer such that shear is induced between said constraining layer and said stiffener layer generally along said longitudinal axis.

26. The dampening assembly as recited in claim 25, wherein the support structure includes a first web and a second web extending therefrom and said stiffener layer is attached to said support structure in between said first and second webs.

27. The dampening assembly as recited in claim 25, wherein said first open-sided shape is an inverted V-shape, said stiffener layer attached to said substrate along a first and second generally linear force transmitting surface to bound said first open-sided shape which faces said substrate.

28. The dampening assembly as recited in claim 27, wherein said stiffener layer is attached to said substrate along a longitudinal edge thereof.

29. The dampening assembly as recited in claim 27, wherein said second open-sided shape is an inverted V-shape.

30. The dampening assembly as recited in claim 25, wherein said constraining layer engages said stiffener layer through said elastomeric layer in a face-to-face interface.

31. The dampening assembly as recited in claim 25, wherein said constraining layer engages said stiffener layer through said elastomeric layer in a continuous face-to-face interface.

32. The dampening assembly as recited in claim 31, wherein said continuous face-to-face interface includes an apex of said constraining layer.

33. The dampening assembly as recited in claim 25, wherein said stiffener layer is attached to said substrate at a first edge and a second edge which define an open side of said open-sided shape.

34. A structural damping assembly comprising:
a bonding plate;
a stiffener layer attached to said bonding plate to define an open-sided shape which faces said bonding plate, said stiffener layer is an inverted V-shape attached to said bonding plate at an open side of said V-shape;
a constraining layer; and
an elastomeric layer sandwiched between said stiffener layer and said constraining layer.

35. A structural damping assembly comprising:
a bonding plate;
a stiffener layer attached to said bonding plate to define an open-sided shape which faces said bonding plate, said stiffener layer attached to said bonding plate at a first edge and a second edge which define an open side of said open-sided shape;
a constraining layer which is an inverted V-shape; and
an elastomeric layer sandwiched between said stiffener layer and said constraining layer.

36. A structural damping assembly for attachment to a substrate comprising:
a stiffener layer attachable to a substrate to defines an open-sided shape which faces the substrate, said stiffener layer is an inverted V-shape attachable to the substrate at an open side of said V-shape;
a constraining layer; and
an elastomeric layer sandwiched between said stiffener layer and said constraining layer such that shear is induced between said constraining layer and said stiffener layer generally along a longitudinal axis.

37. A structural damping assembly for attachment to a substrate comprising:
a stiffener layer attachable to a substrate to define an open-sided shape which faces the substrate, said stiffener layer attached to the substrate at a first edge and a second edge which define an open side of said open-sided shape;
a constraining layer which is an inverted V-shape; and
an elastomeric layer sandwiched between said stiffener layer and said constraining layer such that shear is induced between said constraining layer and said stiffener layer generally along a longitudinal axis.

* * * * *